United States Patent [19]

Winkler

[11] 4,091,073
[45] May 23, 1978

[54] PROCESS FOR THE REMOVAL OF $H_2S$ AND $CO_2$ FROM GASEOUS STREAMS

[75] Inventor: Hans J. S. Winkler, Basel, Switzerland

[73] Assignee: Shell Oil Company, Houston, Tex.

[21] Appl. No.: 608,859

[22] Filed: Aug. 29, 1975

[51] Int. Cl.² .............................................. B01D 53/34
[52] U.S. Cl. ................................ 423/226; 423/573 G; 55/68; 55/73
[58] Field of Search ............... 423/224, 226, 228, 573, 423/573 L; 55/68, 73

[56] References Cited

U.S. PATENT DOCUMENTS

| | | | |
|---|---|---|---|
| 2,926,751 | 3/1960 | Kohl et al. | 423/226 X |
| 3,226,320 | 12/1965 | Meuly et al. | 423/224 X |
| 3,347,621 | 10/1967 | Papadopoulos et al. | 423/226 |
| 3,622,273 | 11/1971 | Roberts et al. | 423/226 |
| 3,681,015 | 8/1972 | Gelbein et al. | 423/228 |

FOREIGN PATENT DOCUMENTS

| | | | |
|---|---|---|---|
| 1,430,889 | 1/1966 | France | 423/226 |
| 999,800 | 7/1965 | United Kingdom | 423/573 L |

*Primary Examiner*—Earl C. Thomas
*Attorney, Agent, or Firm*—Albert J. Adamcik

[57] ABSTRACT

A cyclic process for the simultaneous removal of hydrogen sulfide and carbon dioxide from a variety of gas streams is disclosed. The gas stream containing the sour gases is contacted with a solution of the Fe (III) chelate of N-(2-hydroxyethyl) ethylene diamine triacetic acid in a $CO_2$ selective solvent. The hydrogen sulfide is converted to sulfur, the $CO_2$ is absorbed to produce a purified gas stream, and the Fe (III) chelate is converted to the Fe (II) chelate. The process includes sulfur removal and simultaneous regeneration of the solvent and the Fe (III) chelate.

14 Claims, 1 Drawing Figure

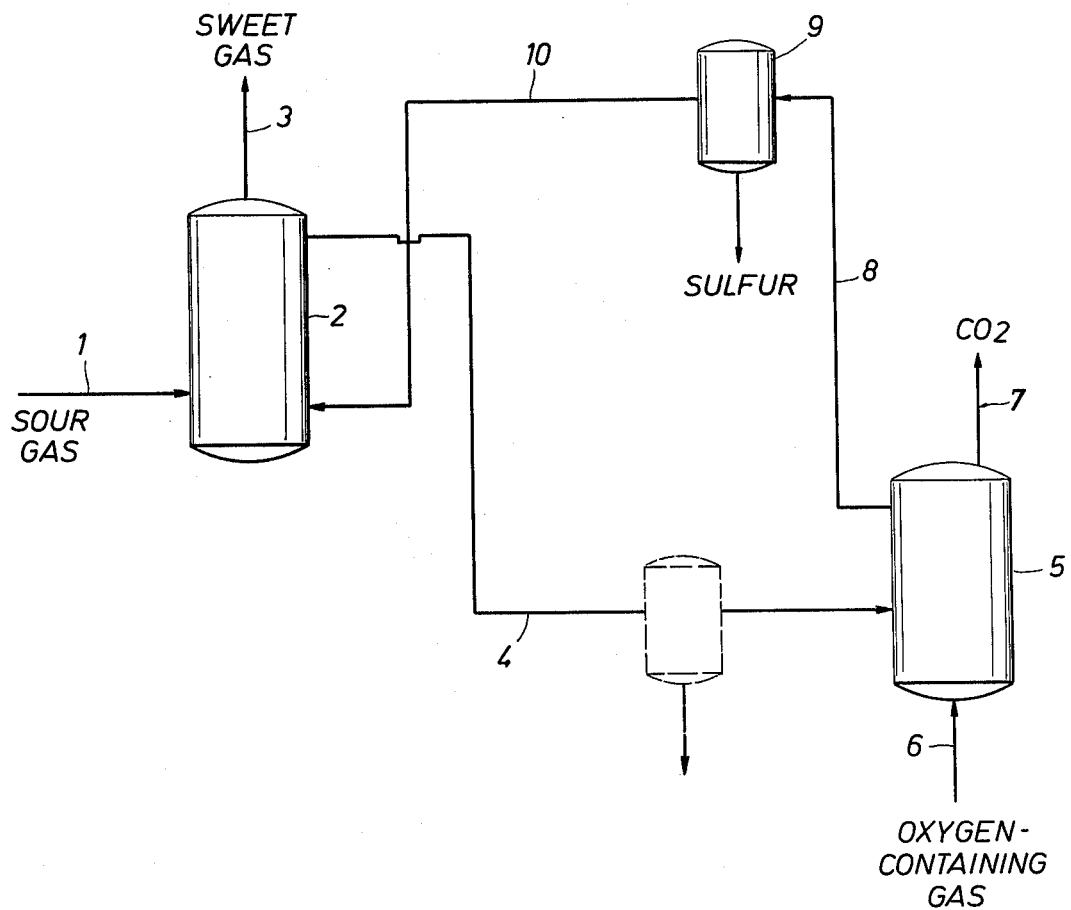

PROCESS FOR THE REMOVAL OF H₂S AND CO₂ FROM GASEOUS STREAMS

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are unattractive for a variety of reasons. Accordingly, there remains a need for an efficient and low cost process to remove these undesired materials.

While some work has been done in the area of removal and conversion of $H_2S$ to sulfur by use of iron complexes in waste gas streams, such processes generally ar inapplicable directly to purification of hydrocarbon feedstock, coal gasification, or natural gas streams having high ratios of $CO_2$ to $H_2S$. For example, U.S. Pat. No. 3,266,320 (Meuly, et al.) discloses the removal of $H_2S$ from fluids passing through or leaving industrial processes by adding to the polluted streams certain chelates of polyvalent metals. The chelates are added in an amount which is stoichiometrically substantially less than the amount of the pollutant, and the chelate- and pollutant-containing stream is contacted with oxygen. The preferred chelates are the iron, cobalt, and nickel chelates of acetyl acetone, cyclopentadiene, ethylene diamine tetraacetic acid, N-hydroxyethyl ethylene diamine triacetic acid, gluconic acid, tartaric acid and citric acid. The chelate is said to catalyze the reaction.

As indicated, however, this procedure is unsuited to gaseous hydrocarbon feedstock, coal gasification stream, or natural gas treatment since no provision is made for $CO_2$ removal. More importantly, the use of oxygen with the materials contemplated would be intolerable. Finally, the amounts of chelate employed in the patent are merely catalytic, and do not give the desired degree of $H_2S$ removal from gaseous streams.

Similarly, U.S. Pat. No. 3,622,273 (Roberts and Johnson) discloses the removal of $H_2S$ from a gaseous stream by contacting the gaseous stream with a solution containing, by weight, from 0.005 to 20 percent of a ferric ion complex, from 25.0 to 99.945 percent of water, and from 0.05 to 10.0 percent of a buffering agent selected from the group consisting of alkali metal carbonate and alkali metal bicarbonate. According to the patentees, known complexing agents, such as nitriloacetic acid and ethylene diamine tetraacetic acid, present stability problems when employed in $H_2S$ removal. To overcome these problems, the patentees specify the addition of a buffer to the treating solution, in the amount and type indicated previously. The ferrous complex resulting from reaction of the ferric complex with the $H_2S$ may be regenerated in a separate zone and reused indefinitely.

Nonetheless, there remains a need for an economical and efficient method of $H_2S$ and $CO_2$ removal which avoids the stability problems mentioned and the requirement of added buffering, etc. The present invention satisfies that need.

SUMMARY OF THE INVENTION

Accordingly, the present invention is directed to a process for the separation of $H_2S$ and $CO_2$ from gaseous streams by use of a selective absorbent, and a reactant for converting the $H_2S$ to sulfur. More particularly, the invention is directed to a process for the removal of $H_2S$ and $CO_2$ from gaseous streams, such as streams derived from coal gasification or liquefaction, synthesis gas streams, and various hydrocarbon streams, such as refinery feedstocks and natural gas, by selectively absorbing the $CO_2$ in an organic solvent, and concomitantly converting the $H_2S$ to sulfur. Broadly, this is accomplished by contacting the "sour" gaseous stream with an absorbent mixture containing a selective absorbent for $CO_2$ (and preferably for $H_2S$, as well) and an effective amount of the Fe (III) chelate of N-(2-hydroxyethyl) ethylene diamine triacetic acid. A purified or "sweet" gaseous stream is produced which meets general industrial and commercial $H_2S$ and $CO_2$ specifications. The $CO_2$ is absorbed and the $H_2S$ is immediately converted to sulfur by the Fe (III) chelate of N-(2-hydroxyethyl) ethylene diamine triacetic acid. In the process, the Fe (III) chelate is reduced to the Fe (II) chelate. The invention also provides for the regeneration of the Fe (II) chelate of N-(2-hydroxyethyl) ethylene diamine triacetic acid, for release of the absorbed $CO_2$, and for the removal of the sulfur from the absorbent mixture. The regenerated absorbent mixture may then be returned for further use.

The particular type of gaseous stream treated is not critical, as will be evident to those skilled in the art. Streams particularly suited to removal of $H_2S$ and $CO_2$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ and $CO_2$, and other gaseous hydrocarbon streams. The term "hydrocarbon streams", as employed herein, is intended to include streams containing significant quantities of hydrocarbon (both paraffinic and aromatic), it being recognized that such streams containing significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 5 percent by volume. $CO_2$ content may also vary, but preferably will range from about 0.5 percent to about 50.0 percent by volume. Obviously, the amount of $H_2S$ and $CO_2$ present is not generally a limiting factor in the practice of the invention.

The temperatures employed in the absorption zone are not generally critical, except in the sense that the temperatures employed must permit acceptable absorption of $CO_2$. A relatively wide range of temperatures, e.g., from 0° to 40° or even 50° C may be utilized, although a range of from about 0° to about 30° C is preferred. In many commercial applications, such as the removal of $H_2S$ and $CO_2$ from natural gas to meet pipeline specifications, absorption at ambient temperatures is preferred, since the cost of refrigeration would exceed the benefits obtained due to increased absorption at the lower temperature. However, certain applications, such as the treatment of gas mixtures containing relatively high concentrations of $CO_2$, absorption may be conducted at relatively low temperatures, i.e., below 30° C, and preferably below 10° C, even though refrigeration of the absorbent and/or feed may be required. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 0° to 110° C, preferably 0° to 90° C may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures will range from about one atmosphere to about three or four atmospheres. The pressure-temperature relationships involved are well understood by those skilled in the art, and need not be detailed herein. The procedure may be conducted either batch-wise or continuously.

As indicated, the $H_2S$, when contacted, is quickly converted by the Fe (III) chelate of N-(2-hydroxyethyl) ethylene diamine - N,N-triacetic acid to elemental sulfur. Solutions of the Fe (III) chelate of N-(2-hydroxyethyl) ethylene diamine - N,N-triacetic acid are uniquely efficient in removing $H_2S$ from sour gas. Since the Fe (III) chelate (and the Fe (II) chelate) has limited solubility in many solvents or absorbents, the chelate is preferably supplied in admixture with the liquid absorbent and water. The amount of chelate supplied is that amount sufficient to convert all or substantially all of the $H_2S$ in the gas stream, and will generally be on the order of at least about two mols per mol of $H_2S$. Ratios of from about 2 mols to about 15 mols of chelate per mol of $H_2S$ may be used, with ratios of from about 2 mols per mol to about 5 mols of chelate per mol of $H_2S$ being preferred. The manner of preparing the admixture is a matter of choice. For example, the chelate may be added to the absorbent, and, if necessary, then water added. The amount of water added will normally be just that amount necessary to achieve solution of the chelate, and can be determined by routine experimentation. Since the chelate may have a significant solubility in the solvent, and since water is produced by the reaction of the $H_2S$ and the chelate, precise amounts of water to be added cannot be given. In the case of absorbents having a low solubility for the chelate, approximately 5 percent to 10 percent water by volume, based on the total volume of the absorbent mixture, will generally provide solvency. Preferably, however, the chelate is added as an aqueous solution to the liquid absorbent. Where the chelate is supplied as an aqueous solution, the amount of chelate solution supplied may be about 20 percent to about 80 percent by volume of the total absorbent admixture supplied to the absorption zone. The Fe (III) chelate solution will generally be supplied as an aqueous solution having a concentration of from about 2 molar to about 3 molar. A concentration of about 2 molar is preferred.

The loaded absorbent mixture is regenerated by contacting the mixture in a regeneration zone or zones, with an oxygen-containing gas. The oxygen-containing gas may be air, oxygen, or air-enriched with oxygen. The oxygen-containing gas accomplishes two functions, the stripping of the $CO_2$ from the loaded absorbent mixture, and the oxidation of the Fe (II) N-(2-hydroxyethyl) ethylene diamine triacetic acid to the Fe (III) chelate of N-(2-hydroxyethyl) ethylene diamine triacetic acid. The oxygen (in whatever form supplied) is supplied in a stoichiometric equivalent or excess with respect to the amount of Fe (II) chelate present in the mixture. Preferably, the oxygen-containing gas is supplied in an amount of from about 1.2 to 3 times excess.

The absorbents employed in the invention are those absorbents which have a high degree of selectivity in absorbing $CO_2$ (and preferably $H_2S$ as well) from the gaseous streams. Any of the known absorbents conventionally used which do not affect the activity of the Fe (III) chelate and which exhibit sufficient solubility for the chelate or an aqueous solution of the chelate may be employed. As indicated, the absorbent preferably has good absorbency for $H_2S$ as well, in order to assist in the removal of any $H_2S$ present in the gaseous streams. The particular abosorbent chosen is a matter of choice, given these qualifications, and selection can be made by routine experimentation. For example, propylene carbonate, tetrethylene glyco-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

DETAILED DESCRIPTION OF THE INVENTION

In order to describe the invention in greater detail, reference is made to the accompanying drawing. The values given herein relating to temperatures, pressures, compositions, etc., should be considered merely exemplary and not as delimiting the invention.

As shown, sour gas, e.g., natural gas containing about 0.5 percent $H_2S$, and 32 percent by volume $CO_2$ in line 1 enters absorption column 2 (tray type) into which also enters an absorbent mixture composed of 90 percent N-methylpyrrolidone (by weight) and 10 percent of an aqueous 2.0 M solution of the Fe (III) chelate of N-(2-hydroxyethyl) ethylene diamine triacetic acid. The pressure of the feed gas is about 1200 p.s.i.g., and the temperature of the absorbent mixture is about 45° C. A contact time of about 45 seconds is employed in order to absorb virtually all $CO_2$ and react all the $H_2S$. Purified or "sweet" gas leaves absorption column 2 through line 3. The "sweet" gas is of a purity sufficient to meet standard requirements. In the absorbeny mixture, the $H_2S$ is converted to elemental sulfur by the Fe (III) chelate, the Fe (III) chelate in the process being converted to the Fe (II) chelate. The absorbent mixture, containing the elemental sulfur, absorbed $CO_2$ and the Fe (II) chelate, is removed continuously and sent through line 4 to regeneration zone 5. Prior to entry to zone 5, the sulfur in the absorbent mixture may be removed in a sulfur separation zone (shown in dotted lines). However, sulfur recovery may also be accomplished at a later stage, as shown hereinafter.

In regeneration zone 5 the loaded absorbent mixture is contacted with excess air in line 6 to strip the $CO_2$ from the mixture and convert the Fe (II) chelate to the Fe (III) chelate. The temperature of the stripping column is about 45° C, and pressure in the column is maintained at about 2 atmospheres. $CO_2$ is removed from column 5 through line 7, while regenerated absorbent mixture, which still contains elemental sulfur, is sent through line 8 to sulfur stripping zone 9. Any absorbent carried over with the vented $CO_2$ may be recovered by conventional equipment, such as a carbon adsorption bed (not shown), and recycled. In unit 9, which is preferably a settler, the sulfur is removed from the absorbent mixture and recovered. The now fully regenerated absorbent mixture is returned via line 10 to absorption zone 2.

I claim:

1. A process for the removal of $H_2S$ and $CO_2$ from a sour gaseous stream comprising:
   A. contacting the sour gaseous stream with a lean $CO_2$-selective absorbent mixture containing an effective amount of the Fe (III) chelate of N-(2-hydroxyethyl) ethylene diamine triacetic acid, and producing a sweet gaseous stream and an absorbent admixture containing absorbed $CO_2$, sulfur, and the Fe (II) chelate of N-(2-hydroxyethyl) ethylene diamine triacetic acid,
   B. removing sulfur from the absorbent admixture, and leaving a solution containing absorbed $CO_2$ and the Fe (II) chelate of N-(2-hydroxyethyl) ethylene diamine triacetic acid,
   C. stripping the solution containing absorbed $CO_2$ and the said Fe (II) chelate and regenerating the Fe (III) chelate of N-(2-hydroxyethyl) ethylene diamine triacetic acid in said solution with an oxygen-containing gas, producing a lean $CO_2$-selective absorbent solution containing the Fe (III) chelate of N-(2-hydroxyethyl) ethylene diamine triacetic acid, and
   D. returning the lean $CO_2$-selective absorbent solution containing the Fe (III) chelate of N-(2-hydroxyethyl) ethylene diamine triacetic acid to step A.

2. The method of claim 1 wherein the absorbent is selected from the group consisting of propylene carbonate, tetra-ethylene glycoldimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2.

3. The method of claim 1 wherein the stream from which the $H_2S$ and $CO_2$ are removed is selected from naturally occurring gases, synthesis gases, process gases, and fuel gases.

4. The method of claim 3 wherein the sour gaseous stream is a stream derived from the gasification and partial oxidation of a liquid hydrocarbon.

5. The process of claim 3 wherein heat is supplied in step (C) to assist in regeneration.

6. The method of claim 3 wherein the stream from which the $H_2S$ and $CO_2$ are removed is a fuel gas stream produced by gasification of a material selected from coal, petroleum, oil shale, or tar sands.

7. The method of claim 6 wherein the sour gaseous stream is a stream derived from the gasification of coal.

8. A process for the removal of $H_2S$ and $CO_2$ from a sour gaseous stream comprising:
   A. contacting the sour gaseous stream with a lean $CO_2$-selective absorbent solution containing an effective amount of the Fe (III) chelate of N-(2-hydroxyethyl) ethylene diamine triacetic acid, and producing a sweet gaseous stream and an absorbent mixture containing absorbed $CO_2$, sulfur, and the Fe (II) chelate of N-(2-hydroxyethyl) ethylene diamine triacetic acid,
   B. stripping the solution containing absorbed $CO_2$, sulfur, and the said Fe (II) chelate and regenerating the Fe (III) chelate of N-(2-hydroxyethyl) ethylene diamine triacetic acid in said solution with an oxygen-containing gas, producing a lean $CO_2$-selective absorbent solution containing the Fe (III) chelate of N-(2-hydroxyethyl) ethylene diamine triacetic acid, and sulfur,
   C. removing sulfur from the lean $CO_2$-selective absorbent solution containing the sulfur and the Fe III chelate of N-(2-hydroxyethyl) ethylene diamine triactic acid, and leaving a lean $CO_2$-selective absorbent solution containing the Fe (III) chelate of N-(2-hydroxyethyl) ethylene diamine triacetic acid, and
   D. returning the lean $CO_2$-selective absorbent solution containing the Fe (III) chelate of N-(2-hydroxyethyl) ethylene diamine triacetic acid to step A.

9. The method of claim 8 wherein the absorbent is selected from the group consisting of propylene carbonate, tetra-ethylene glycoldimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2.

10. The method of claim 8 wherein the stream from which the $H_2S$ and $CO_2$ are removed is selected from naturally occurring gases, synthesis gases, process gases, and fuel gases.

11. The process of claim 10 wherein heat is supplied in step (B) to assist in regeneration.

12. The method of claim 10 wherein the sour gaseous stream is a stream derived from the gasification and partial oxidation of a liquid hydrocarbon.

13. The method of claim 10 wherein the stream from which the $H_2S$ and $CO_2$ are removed is a fuel gas stream produced by gasification of a material selected from coal, petroleum, oil shale, or tar sands.

14. The method of claim 13 wherein the sour gaseous stream is a stream derived from the gasification coal.

* * * * *